US012617297B2

(12) United States Patent
Morishita et al.

(10) Patent No.: US 12,617,297 B2
(45) Date of Patent: May 5, 2026

(54) CONSTRUCTION MACHINE

(71) Applicant: Yanmar Holdings Co., Ltd., Osaka (JP)

(72) Inventors: Shoto Morishita, Osaka (JP); Kensuke Kaneda, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 285 days.

(21) Appl. No.: 18/271,480

(22) PCT Filed: Dec. 9, 2021

(86) PCT No.: PCT/JP2021/045292
§ 371 (c)(1),
(2) Date: Jul. 10, 2023

(87) PCT Pub. No.: WO2022/153735
PCT Pub. Date: Jul. 21, 2022

(65) Prior Publication Data
US 2024/0051405 A1    Feb. 15, 2024

(30) Foreign Application Priority Data

Jan. 14, 2021    (JP) ................................. 2021-004339

(51) Int. Cl.
B60L 50/53         (2019.01)
B60L 53/62         (2019.01)
(Continued)

(52) U.S. Cl.
CPC ............... B60L 50/53 (2019.02); B60L 53/62 (2019.02); B60L 58/15 (2019.02);
(Continued)

(58) Field of Classification Search
CPC .......... B60L 50/53; B60L 50/60; B60L 58/15; B60L 2200/40
See application file for complete search history.

(56) References Cited

U.S. PATENT DOCUMENTS 9,203,261 B2    12/2015  Sugiyama
11,383,602 B2 *  7/2022  Kaneda ................... B60L 50/53
(Continued)

FOREIGN PATENT DOCUMENTS

JP        2002325379 A    11/2002
JP        2019190105 A    10/2019
WO        2012102351 A1    8/2012

*Primary Examiner* — Brian L Swenson
(74) *Attorney, Agent, or Firm* — Chris Mizumoto

(57) ABSTRACT

An exemplary construction machine comprises a power supply device that is connected to an external power source and outputs first power, a battery provided to be chargeable with the first power, and an electric motor that is driven by the first power and/or second power discharged by the battery. The construction machine further comprises a control device that controls the construction machine in any of a plurality of modes including a drive chargeable mode in which the first power can be used for charging the battery while being used for driving the electric motor, and a charge-only mode in which the first power can be used only for charging the battery. In the case of the drive chargeable mode, the control device sets the upper limit value of the amount of charge of the battery lower than in the case of the charge-only mode.

7 Claims, 8 Drawing Sheets

(51) Int. Cl.
    B60L 58/15         (2019.01)
    H01M 10/44       (2006.01)
    H02J 7/00         (2006.01)

(52) U.S. Cl.
    CPC ......... H01M 10/443 (2013.01); H02J 7/0068
        (2013.01); *B60L 2200/40* (2013.01); *B60L*
      *2240/54* (2013.01); *B60L 2240/545* (2013.01);
                    *H01M 2220/20* (2013.01)

(56)                 References Cited

U.S. PATENT DOCUMENTS

| | | | |
|---|---|---|---|
| 2010/0072953 A1 | 3/2010 | Mitsutani | |
| 2013/0300378 A1* | 11/2013 | Sugiyama | E02F 9/128 |
| | | | 320/162 |
| 2014/0103874 A1* | 4/2014 | Ishida | B60L 50/16 |
| | | | 320/109 |
| 2015/0231974 A1* | 8/2015 | Yunoue | E02F 3/325 |
| | | | 307/10.1 |
| 2019/0252909 A1* | 8/2019 | Sugiyama | H02J 7/345 |
| 2021/0025132 A1* | 1/2021 | Ishii | B60L 53/14 |
| 2021/0086618 A1* | 3/2021 | Kaneda | E02F 3/325 |
| 2022/0074163 A1* | 3/2022 | Terashima | B60L 58/18 |
| 2023/0167623 A1* | 6/2023 | Kitahara | B60L 50/60 |

* cited by examiner

CONSTRUCTION MACHINE

CROSS-REFERENCE

This application is a US National Stage Application under 35 U.S.C. § 371 of International Application No. PCT/JP2021/045292 filed Dec. 9, 2021, which claims foreign priority of JP2021-004339 filed Jan. 14, 2021 and the disclosures of which are hereby incorporated by reference in their entirety.

TECHNICAL FIELD

The present invention relates to a construction machine.

BACKGROUND ART

Conventionally, it is preferable that, from the viewpoint of preventing a battery from being deteriorated, the battery including a lithium-ion battery, etc., should be stored in a state where the state of charge is not too high and not too low (see, for example, Patent Literature 1). In this respect, Patent Literature 1 discloses an optimal method for storing, in a construction machine with a built-in battery, a battery when the construction machine is not in use.

CITATION LIST

Patent Literature

Patent Literature 1: Japanese Unexamined Patent Application Publication No. 2014-014239

DISCLOSURE OF INVENTION

Problems to be Solved by the Invention

By the way, an electric hydraulic excavator with a built-in battery, as the case may be, is used in a state where a cable is connected to an external power source such as a commercial power source. That is, there is present a construction machine that can work using the external power source and the battery power source in combination. The above the construction machine can use the external power source thereby to charge the battery during the work; there is a concern that insufficient control of charging the battery during the work may accelerate deterioration of the battery. The method disclosed in Patent Literature 1 is a method for a case free from performing the work with the construction machine, and thus cannot be applied as is.

It is an object of the present invention is to provide, in a construction machine provided with a battery that is chargeable by an external power source, a technology capable of suppressing a battery from being deteriorated.

Means for Solving the Problems

An exemplary construction machine of the present invention includes: a power supply device that is connected to an external power source and outputs first power; a battery that is so provided as to be capable of charging the first power; and an electric motor that is driven by at least one of the first power and second power which is discharged by the battery. The construction machine further includes a control device that controls the own machine in any of a plurality of modes including a battery drive mode in which only the second power is usable for driving the electric motor, and a drive chargeable mode in which the first power, while being used for driving the electric motor, is usable for charging the battery. The control device, in the drive chargeable mode, sets an upper limit of a state of charge of the battery lower than in the battery drive mode.

Further, an exemplary construction machine of the present invention includes: a power supply device that is connected to an external power source and outputs first power; a battery that is so provided as to be capable of charging the first power; and an electric motor that is driven by at least one of the first power and second power which is discharged by the battery. The construction machine further includes a control device that controls the own machine in any of a plurality of modes including a drive chargeable mode in which the first power, while being used for driving the electric motor, is usable for charging the battery, and a charge-only mode in which the first power is usable only for charging the battery. The control device, in the drive chargeable mode, sets an upper limit of a state of charge of the battery lower than in the charge-only mode.

Effect of the Invention

The exemplary present invention, in the construction machine provided with a battery that is chargeable by an external power source, can suppress a battery from being deteriorated.

DESCRIPTION OF EMBODIMENTS

The following is a description of an embodiment of the present invention based on the drawings.

1. Schematic Configuration of Construction Machine

Figure 1:
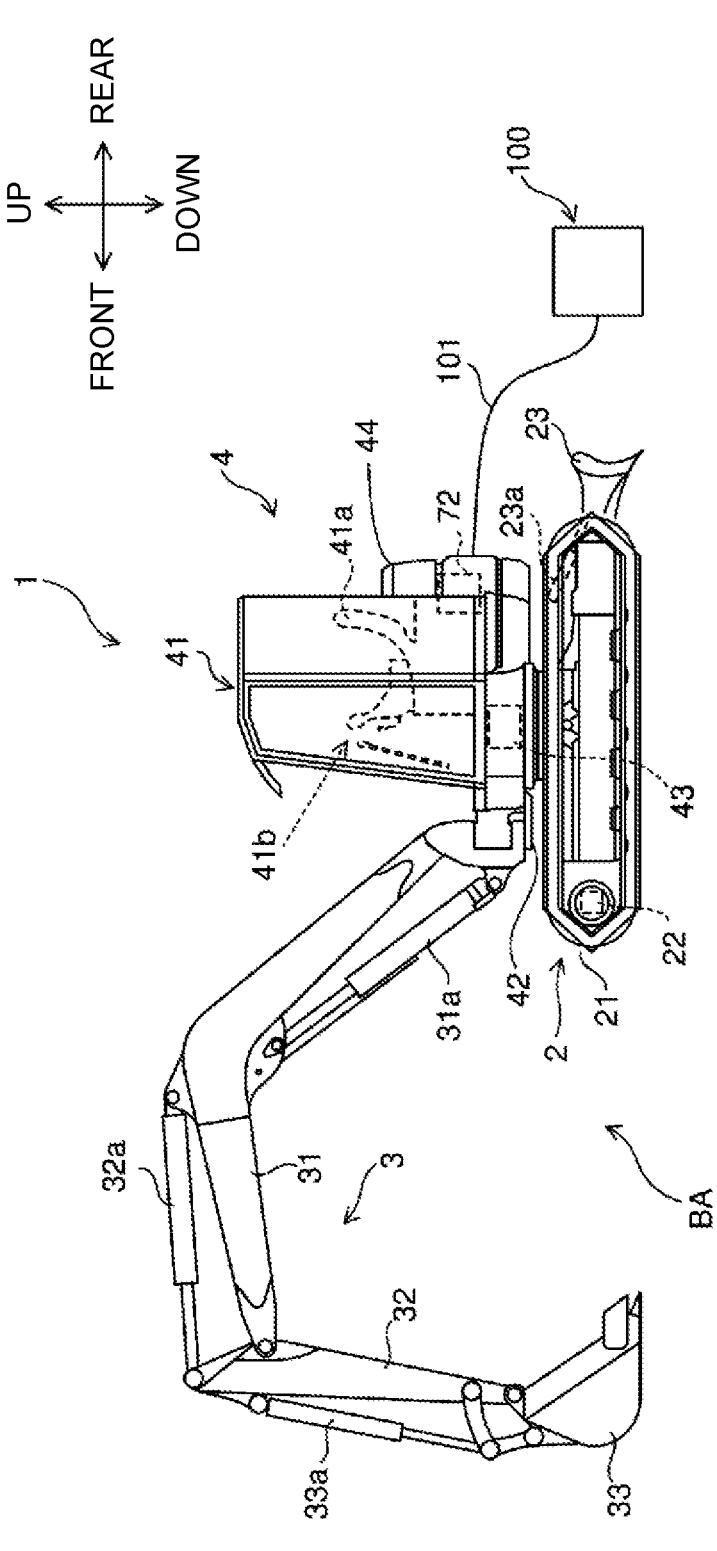
FIG. 1 is a side view of a schematic configuration of a construction machine.

FIG. 1 is a side view showing a schematic configuration of a construction machine 1 according to the present embodiment. The construction machine 1 is, in detail, an electric construction machine. The construction machine 1 is, more specifically, an electric hydraulic excavator. Further, the construction machine to which the present invention is applied is not limited to a hydraulic shovel, and may be another vehicle such as a wheel loader. That is, the construction machine 1 includes a lower run body 2, a work instrument 3, and an upper turn body 4.

Here, in FIG. 1, directions are defined as follows. First, a direction in which the lower run body 2 runs straight ahead is defined as a front-rear direction, one side in the front-rear direction is defined as "front", and the other side in the front-rear direction is defined as "rear". In FIG. 1, a run motor 22 side relative to a blade 23 is shown as "front", as an example. Further, a transverse direction perpendicular to the front-rear direction is defined as a left-right direction. In this case, the left side is "left" and the right side is "right" as viewed from an operator (manipulator, driver) seated on an operation seat 41a. Further, the gravity direction perpendicular to the front-rear and left-right directions is referred to as an up-down direction, with the upstream side of the gravity direction being "up" and the downstream side being "down".

The lower run body 2 is provided with a pair of right and left crawlers 21 and a pair of right and left run motors 22. Each of the run motors 22 is a hydraulic motor. Each of the right and left run motors 22 drives one of the respective right and left crawlers 21, thereby allowing the construction machine 1 to proceed forward and backward. A blade 23 used for performing a ground leveling work and a blade cylinder 23a are provided in the lower run body 2. The blade cylinder 23a is a hydraulic cylinder that turns the blade 23 in the up-down direction.

The work instrument 3 has a boom 31, an arm 32, and a bucket 33. The boom 31, the arm 32, and the bucket 33 are independently driven, thereby making it possible to perform excavation work of earth, sand, etc.

The boom 31 is turned by a boom cylinder 31a. The boom cylinder 31a has a base end part thereof supported by a front part of the upper turn body 4, and is freely movable in an extendable and retractable manner. The arm 32 is turned by an arm cylinder 32a. The arm cylinder 32a has a base end part thereof supported by a tip part of the boom 31, and is freely movable in an extendable and retractable manner. The bucket 33 is turned by a bucket cylinder 33a. The bucket cylinder 33a has a base end part thereof supported by a tip part of the arm 32 and is freely movable in an extendable and retractable manner. The boom cylinder 31a, the arm cylinder 32a, and the bucket cylinder 33a each include a hydraulic cylinder.

The upper turn body 4 is so configured as to be swingable relative to the lower run body 2 via a swing bearing (not shown). In the upper turn body 4, an operation unit 41, a turn base 42, a turn motor 43, an engine chamber 44, etc. are placed. The upper turn body 4 is driven by the turn motor 43 as a hydraulic motor, and thus is turned via a turn bearing. Inside the engine chamber 44, there are placed, for example, an electric motor 5 and a hydraulic pump 61 (see FIG. 2 for both). That is, the construction machine 1 is provided with the electric motor 5.

Figure 2:
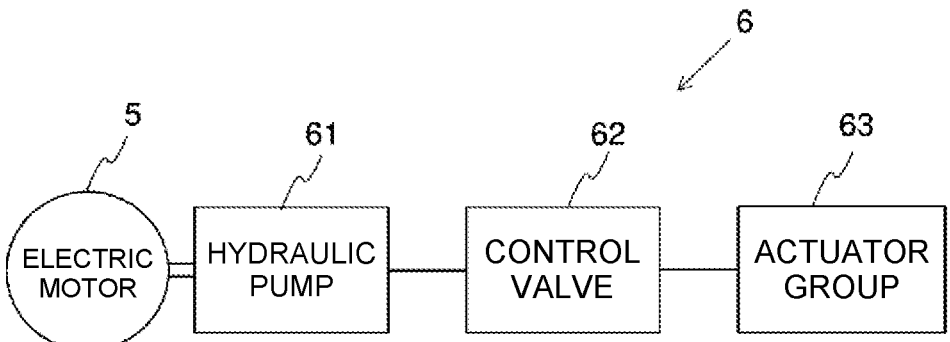
FIG. 2 is a lock diagram showing a schematic configuration of a hydraulic system provided in the construction machine.

FIG. 2 is a block diagram showing the schematic configuration of the hydraulic system 6 provided in the construction machine 1. The hydraulic pump 61 is mechanically connected to an output shaft of the electric motor 5, and is driven by the electric motor 5. The control valve 62 controls the flowrate and direction of the work oil (pressure oil) supplied from the hydraulic pump 61, and properly supplies the work oil to various hydraulic activators included in an activator group 63. In the present embodiment, the various hydraulic activators included in the activator group 63 include hydraulic motors (for example, right and left run motors 22 and turn motor 43) and hydraulic cylinders (for example, blade cylinder 23a, boom cylinder 31a, arm cylinder 32a, bucket cylinder 33a).

Back to FIG. 1, the operation seat 41a is placed in the operation unit 41. Various levers 41b are placed around the operation seat 41a. The operator is seated on the operation seat 41a and operates the lever 41b thereby to activate the hydraulic system 6, making it possible to perform the running of the lower run body 2, ground leveling work with the blade 23, digging work by the work instrument 3, turning the upper turn body 4, and so on.

Further, the upper turn body 4 is provided with a power supply port (not shown). The above power supply port and a commercial power source 100, which is as an external power source, are connected via a power supply cable 101. This allows the electric motor 5 to be driven by the power supplied from the commercial power source 100. Further, supplying the power, which is supplied from the commercial power source 100, to a battery 72 that is detachably mounted to the upper turn body 4 can charge the battery 72.

Further, the lower run body 2, the work instrument 3, and the upper turn body 4 may be so configured as to include an electric run motor, an electric cylinder, and an electric turn motor. In this case, the lower run body 2, the work instrument 3, and the upper turn body 4, without the use of the hydraulic device, can all be driven by the electric power. That is, when the lower run body 2, the work instrument 3, and the upper turn body 4 are collectively referred to as a machine body BA, the machine body BA may be driven only by electric power (all electric) or by a combination of the electric power and the hydraulic device. Thus, it can be said that the construction machine 1 of the present embodiment is a configuration that includes the machine body BA driven at least by electric power.

2. Power Source System

Figure 3:
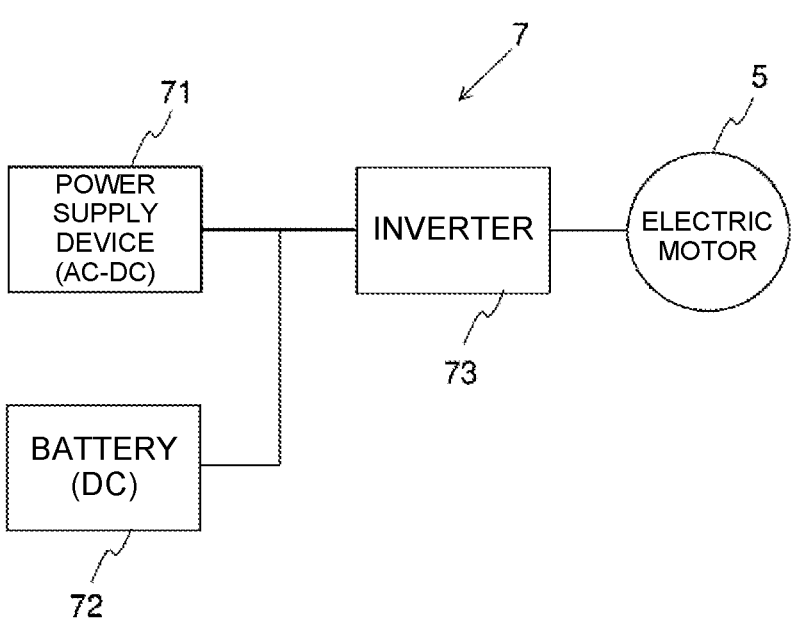
FIG. 3 is Block diagram showing a schematic configuration of a power source system provided in the construction machine.

FIG. 3 is a block diagram showing the schematic configuration of the power source system 7 provided in the construction machine 1 of the present embodiment. The power source system 7 is provided with a power supply device 71, a battery 72, and an inverter 73. That is, the construction machine 1 is provided with the power supply device 71 and the battery 72. The construction machine 1 is further provided with the inverter 73.

The power supply device 71 is connected to an external power source, and outputs the first power. In the present embodiment, the external electrode is the commercial power source 100 (see FIG. 1). The power supply device 71 is placed, for example, in the engine chamber 44. Into the DC voltage, the power supply device 71 converts the AC voltage supplied from the commercial power source 100 via the power supply cable 101. The power supply device 71 is so provided that power after voltage conversion (first power) can be supplied to the battery 72 and the inverter 73.

The battery 72 is so provided as to charge the first power output from the power supply device 71. Further, the battery 72 is so provided as to be able to supply discharge power (second power) to the inverter 73. The battery 72 includes, for example, a lithium-ion battery. The battery 72 is placed, for example, in the engine chamber 44.

Into the AC power, the inverter 73 converts the DC power supplied from the power supply device 71 and the battery 72. The AC power converted by the inverter 73 is supplied to the electric motor 5. The inverter 73 is placed, for example, in the engine chamber 44. Further, the electric motor 5 is driven by the AC power supplied from the inverter 73 thereby to activate the hydraulic pump 61. The electric motor 5 is driven by at least one of the power output from the power supply device 71 (first power) and the power discharged by the battery 72 (second power).

Figure 4A:
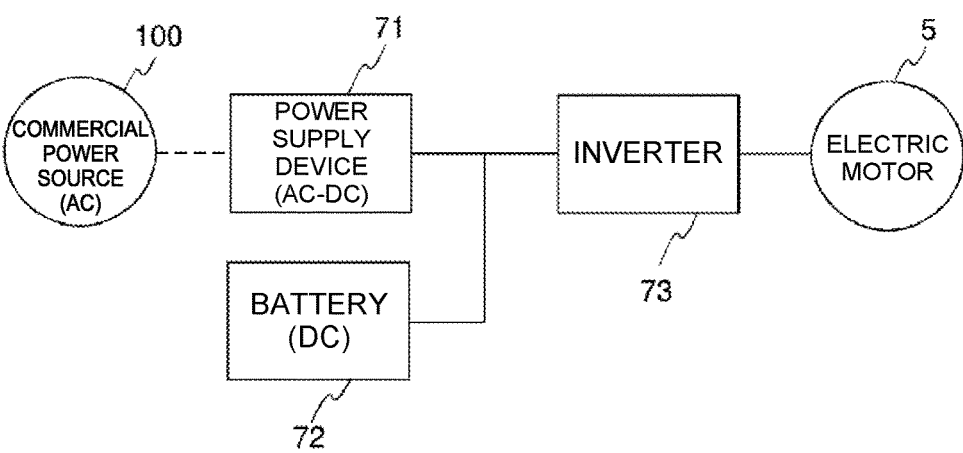
FIG. 4A is a schematic diagram showing the state set in a first mode.
Figure 4B:
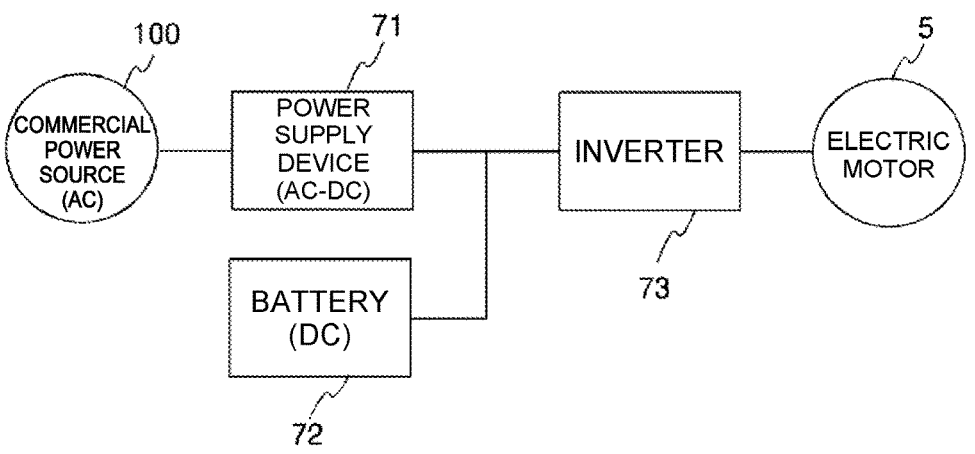
FIG. 4B is a schematic diagram showing the state set in a second mode.
Figure 4C:
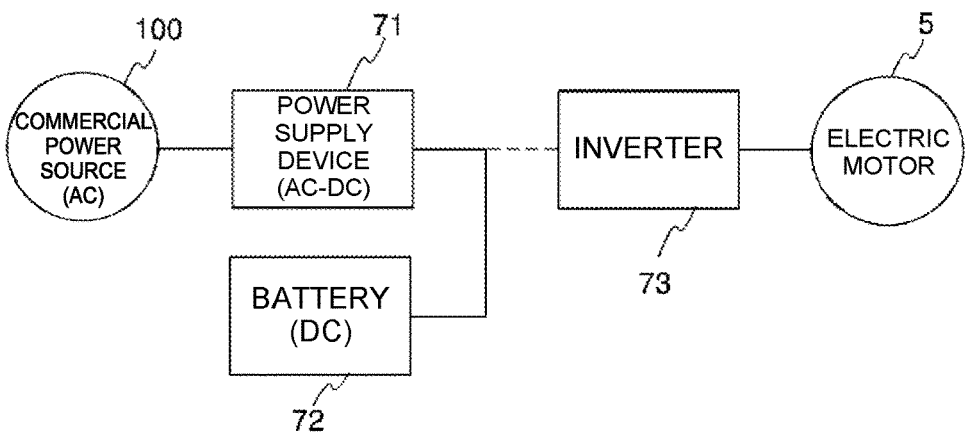
FIG. 4C is a schematic diagram showing the state set in a third mode.

The power source system 7 is so provided as to be settable in three modes including a first mode, a second mode, and a third mode. FIG. 4A is a schematic diagram showing a state of being set in the first mode. FIG. 4B is a schematic diagram showing a state of being set in the second mode. FIG. 4C is a schematic diagram showing a state of being set in the third mode. Further, the first mode corresponds to the battery drive mode of the present invention. The second mode corresponds to the drive chargeable mode of the present invention. The third mode corresponds to the charge-only mode of the present invention.

As shown in FIG. 4A, in the first mode, the commercial power source 100 and the power supply device 71 are electrically unconnected. Thus, in the first mode, the power cannot be supplied from the power supply device 71 to the inverter 73. In the first mode, meanwhile, the battery 72 and the inverter 73 are electrically connected, and the discharge power of the battery 72 can be supplied to the inverter 73. That is, the first mode is a mode in which only the power discharged by the battery 72 (the second power) is usable for driving the electric motor 5. The first mode is used when the electric motor 5 is to be activated with no external power source.

As shown in FIG. 4B, in the second mode, the power supply device 71 is electrically connected to the commercial power source 100. Further, the battery 72 is electrically connected with the inverter 73. The second mode is used when the electric motor 5 is to be operated with power available from the external source. In detail, the second mode includes the four states shown in FIG. 5A, FIG. 5B, FIG. 5C, and FIG. 5D.

Figure 5A:
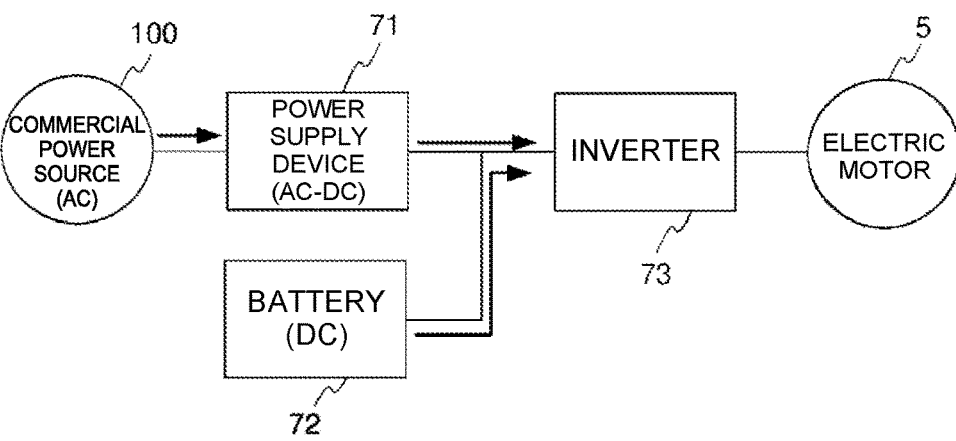
FIG. 5A is a schematic diagram showing a case where a first state is selected in the second mode.
Figure 5B:
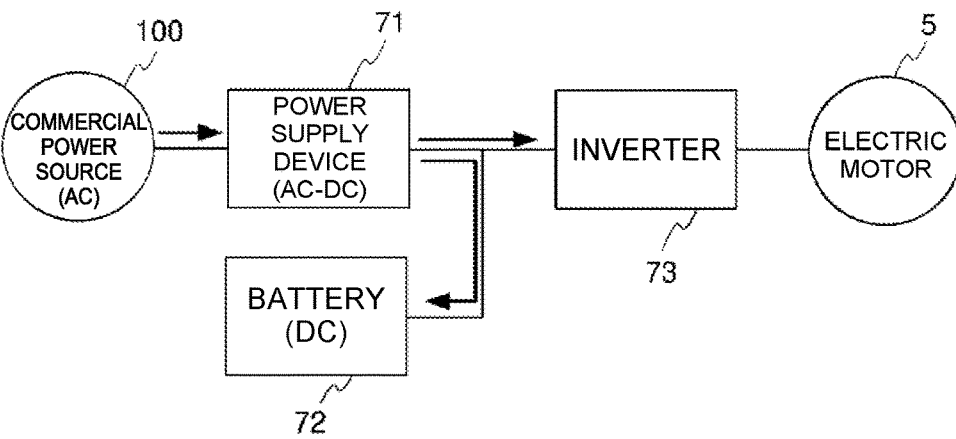
FIG. 5B is a schematic diagram showing a case where a second state is selected in the second mode.
Figure 5C:
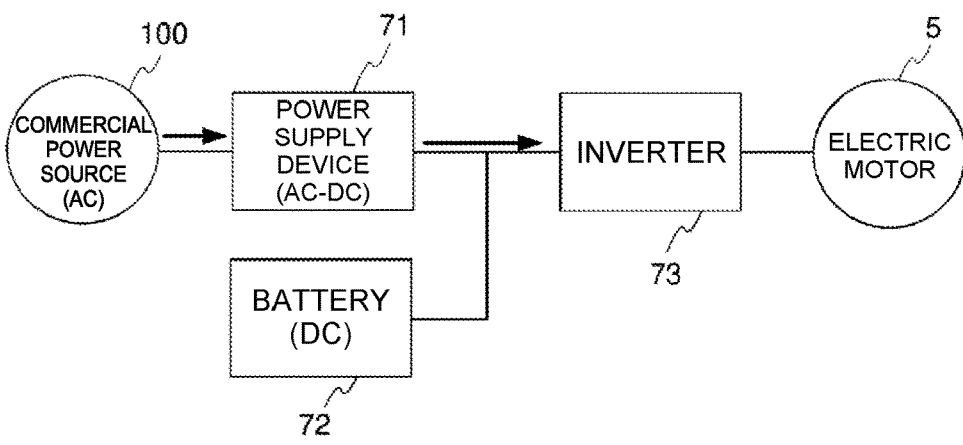
FIG. 5C is a schematic diagram showing a case where a third state is selected in the second mode.
Figure 5D:
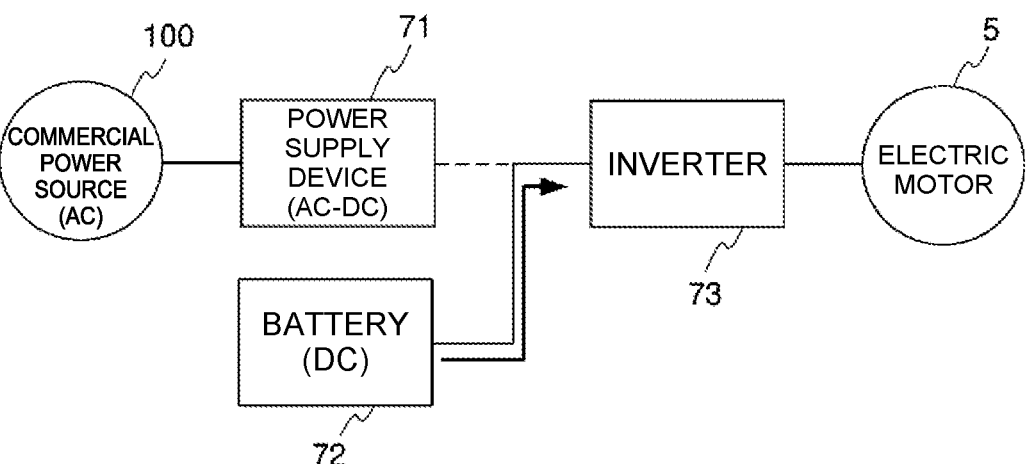
FIG. 5D is a schematic diagram showing a case where a fourth state is selected in the second mode.

FIG. 5A is a schematic diagram showing a case of creating the first state in the second mode. FIG. 5B is a schematic diagram showing a case of creating the second state in the second mode. FIG. 5C is a schematic diagram showing a case of creating the third state in the second mode. FIG. 5D is a schematic diagram showing a case of creating the fourth state in the second mode.

As shown in FIG. 5A, in the first state, the power is supplied from the power supply device 71 and the battery 72 to the inverter 73. The first state is selected when only the power output from one of the power supply device 71 and the battery 72 is not sufficient to acquire the power necessary for driving the electric motor 5. For example, in the first state, most of the power necessary for driving the electric motor 5 is provided by the power output from the power supply device 71, and the lacking power is supplemented by the power output from the battery 72 (discharge power).

As shown in FIG. 5B, in the second state, the power is supplied from the power supply device 71 to the battery 72 and the inverter 73. The second state is selected when the power output from the power supply device 71 is greater than the power necessary for driving the electric motor 5. The battery 72 stores part of the power output from the power supply device 71. That is, the battery 72 is charged by the power supplied from the power supply device 71.

As shown in FIG. 5C, in the third state, the power is supplied from only the power supply device 71 to the inverter 73. The third state is selected when, for example, the power output from the power supply device 71 is equal to the power necessary for driving the electric motor 5. Further, the third state may be a state in which the battery 72, using a relay, is electrically disconnected from the power supply device 71 and the inverter 73.

As shown in FIG. 5D, the fourth state is a state where the power supply device 71 is ready to supply power but is forcibly disconnected from the inverter 73. For example, the relay (not shown) is used to switch between electrical connection and disconnection between the power supply device 71 and the inverter 73. The fourth state is selected, for example, when the power of the battery 72 is to be actively used.

As can be seen from the above, the second mode is a mode in which the power output from the power supply device 71 (first power), while being used for driving the electric motor 5, is usable for charging the battery 72. In the second mode, at least one of the power output from the power supply device 71 (first power) and the power discharged from the battery 72 (second power) is usable for driving the electric motor 5. Creating the above configuration allows the battery 72's charging and discharging to be properly controlled thereby to extend the life of the battery 72, while properly supplying the power necessary for driving the electric motor 5.

As shown in FIG. 4C, in the third mode, the power supply device 71 and the battery 72 are not electrically connected with the inverter 73. For example, the relay (not shown) is used to switch between electrical connection and disconnection between the power supply device 71 and battery 72, and the inverter 73. In the third mode, the power supply device 71 is electrically connected with the battery 72. The third mode is a mode in which the power output from the power supply device 71 (first power) is usable only for charging the battery 72. The third mode is used when there is no need to drive the electric motor 5. For example, the case of no need to drive the electric motor 5 is a state of no need for movement using the lower run body 2, for performing the ground leveling work using the blade 23, and for performing the digging work using the work instrument 3. For example, the third mode is used to charge the battery 72 in preparation for the next use of the construction machine 1.

3. Charge Control

Figure 6:
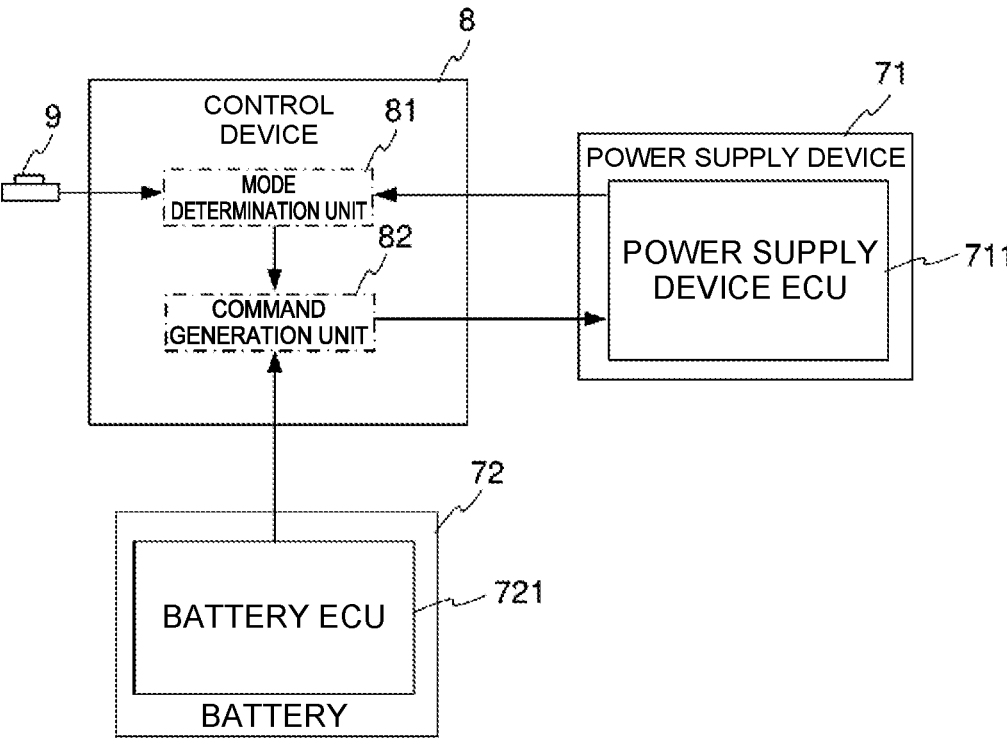
FIG. 6 is a block diagram showing a schematic of a configuration related to the control of the power source system.

FIG. 6 is a block diagram showing a schematic of a configuration related to the control of the power source system 7. As shown in FIG. 6, the construction machine 1 is provided with a control device 8. The control device 8 includes an electronic control device referred as to an ECU (Electronic Control device). The ECU is a device that performs control using an electronic circuit, and includes a microcontroller (microcomputer), for example. The microcontroller, for example, includes a CPU (Central Processing Unit), a storage that stores a program, etc., and an input/output unit for communicating with a peripheral device.

In conjunction with a power supply device ECU 711 built in the power supply device 71 and a battery ECU 721 built in the battery 72, the control device 8 controls an entirety of the power source system 7. Further, the control device 8 controls the own machine 1 in any of the first mode, the second mode, and the third mode. The control device 8 is provided with a mode determination unit 81 and a command generation unit 82. The mode determination unit 81 and the command generation unit 82 are the control device 8's functions that are realized by a computer such as a CPU performing an arithmetic process in accordance with a program stored in the storage.

Further, the mode determination unit 81 and the command generation unit 82 are conceptual component elements. The function performed by one component element may be distributed to among multiple component elements, or the functions of multiple component elements may be integrated into a single component element.

The mode determination unit 81 determines which mode is the current mode of the power source system 7. In detail, the mode determination unit 81 determines whether the current mode is the first, second, or third mode. Based on information acquired from the power supply device ECU 711 and information acquired from a charge start switch 9, for example, the mode determination unit 81 determines which mode is the current mode. Further, the charge start switch 9 is a switch that a user operates when wishing to charge the battery 72. The charge start switch 9 is provided, for example, in the operation unit 41. The charge start switch 9 may be, for example, an operation button, an operation lever, an operation dial, a touch screen, etc.

The mode determination unit 81 determines the mode based on an energizing signal from the power supply device ECU 711 and a charge ON signal from the charge start switch 9, for example. The energization signal is a signal generated when the power supply device 71 is electrically connected via the power supply cable 101 to the commercial power source 100. The charge ON signal is generated when the user, using the charge start switch 9, requests charging. The charge ON signal may be input via the power supply device ECU 711 to the control device 8.

In detail, the mode determination unit 81, when failing to receive any of the communication signal and the charge ON signal, determines that the first mode is established. The mode determination unit 81, when receiving the communication signal and failing to receive the charge ON signal, determines that the second mode is established. The mode determination unit 81, when receiving the energizing signal and receiving the charge ON signal, determines that the third mode is established.

Further, when receiving the charge ON signal but failing to receive the energizing signal, the control device 8 cannot perform proper control due to an insufficient preparation for charging. It may be so configured that in the above case, an error is notified. Further, the method of determining the mode in the present embodiment is merely one example; for example, information acquired from the battery ECU 721 may be used for mode determination.

The command generation unit 82 controls the power supply device 71 according to the mode determination by the mode determination unit 81. In detail, the command generation unit 82 controls the power supply device 71 based on, in addition to the mode determination result, the battery 72's information input from the battery ECU 721.

The battery 72's information includes at least one of the voltage of the battery 72 and an SOC (State Of Charge) of the battery 72. The SOC is given by the following equation 1).

$$\text{SOC (\%)} = \text{Remaining capacity (Ah) divided by Full charge capacity (Ah) multiplied by 100} \tag{1}$$

In the present embodiment, the control device 8, in the second mode, sets the upper limit of the state of charge of the battery 72 lower than in the third mode. Creating the above configuration makes it possible, when the construction machine 1 is in action, to prevent the state of charge of the battery 72 from becoming higher than necessary. This can suppress the battery 72 from being deteriorated, making it possible to extend life of the battery 72. Further, with this configuration, the charge capacity of the battery 72, during action of the electric motor 5, can be suppressed lower than the full charge capacity, so that the battery 72 can receive the regenerative power generated by the stop of the electric motor 5, making it possible to prevent a damage to the battery 72.

In detail, the command generation unit 82 gives a voltage command to the power supply device ECU 711 so that the state of charge does not exceed the set upper limit. The power supply device 71 is controlled in response to the voltage command received by the power supply device ECU 711 from the command generation unit 82. The upper limit of the state of charge of the battery 72 is lower in the second mode than in the third mode; thus, a target voltage for charging the battery 72 to the preset upper limit is lower in the second mode than in the third mode. Further, it may be so configured that assuming that the state of charge is expressed in SOC, the upper limit of the state of charge, for example, is set to 100% in the third mode and 80% in the second mode. Further, the numeral values may be properly changed.

Further, it is unpreferable, even during the work of the construction machine 1, that the state of charge (SOC) of the battery 72 is too low. Due to this, it is preferable that the control device 8, when detecting, in the second mode, that the state of charge of the battery 72 is less than the preset lower limit, so controls the power supply device 71 as to start charging the battery 72. Assuming that the state of charge is expressed in SOC, the lower limit of the state of charge in the second mode may be 50%, etc. The lower limit of the state of charge in the second mode may be the same as the above upper limit of the state of charge in the second mode.

Further, the control device 8, in the second mode, sets the upper limit of the state of charge of the battery 72 lower than in the first mode. Due to this, for activating the construction machine 1; first performing the driving in the first mode thereby to properly lower the state of charge of the battery 72 and then performing the switching to the second mode thereby to charge the battery 72 makes it possible to keep the state of charge in the battery 72 at a proper level, not too high and not too low. This can suppress the battery 72 from being deteriorated, making it possible to extend life of the battery 72.

Figure 7:
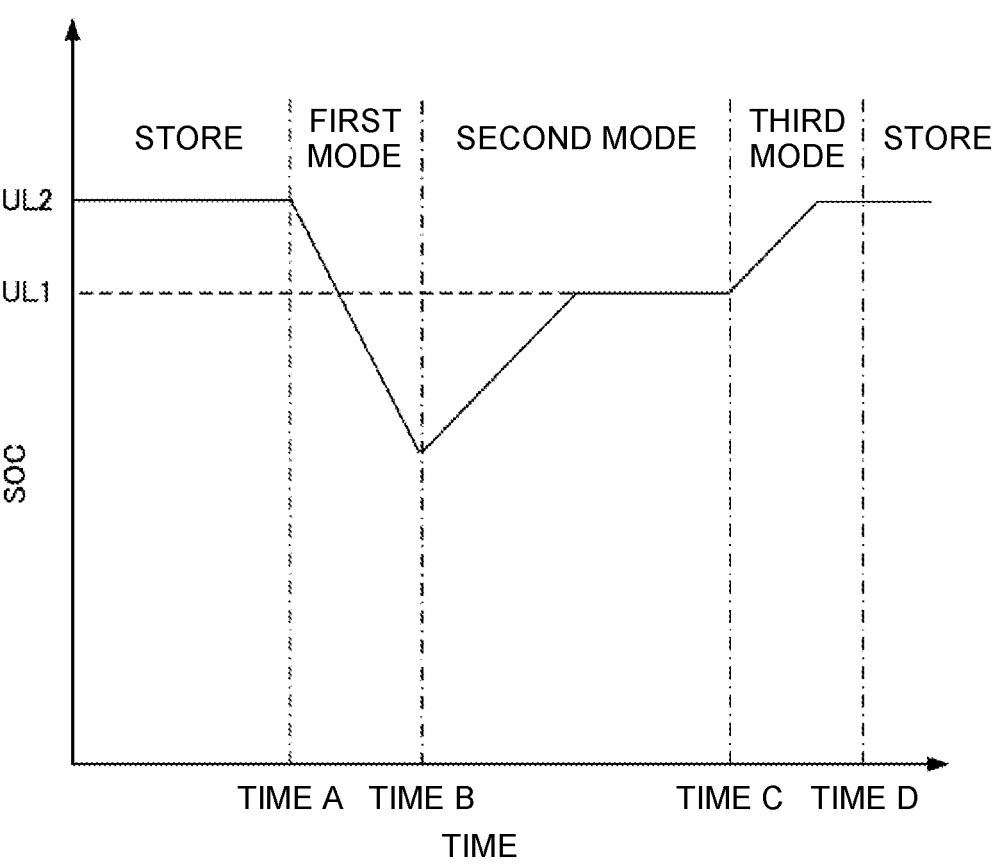
FIG. 7 is a graph showing an example of transition of the one-day SOC of a battery provided in the construction machine.

FIG. 7 is a graph showing an example of transition of the one-day SOC of the battery 72 provided in the construction machine 1. In FIG. 7, the horizontal axis is time and the vertical axis is the SOC of the battery 72. In FIG. 7, the construction machine 1 is put into use at time A; at the start of use, the construction machine 1 is in a place incapable of securing the commercial power source 100. For example, the construction machine 1 is present in a load carrier of a truck, etc. The construction machine 1 needs to drive itself from the load carrier of the truck to the construction site capable of securing the commercial power source 100.

At the start of use, the control device 8 of the construction machine 1, due to no energizing signal acquired, determines that the first mode is established. Due to this, the control device 8 controls the construction machine 1 in the first mode. That is, the construction machine 1 uses only the power discharged from the battery 72 thereby to drive the electric motor 5. The construction machine 1 drives the electric motor 5 thereby to activate the run motor 22, thus running. While the construction machine 1 is controlled in the first mode, the power in the battery 72 continues to be used, thus continuously reducing the SOC of the battery 72, as shown in FIG. 7.

When the construction machine 1 arrives at the construction site by self-run, the power supply device 71 is electrically connected to the commercial power source 100 using the power supply cable 101. This allows the control device 8 to detect the energizing signal thereby to determine that the second mode is established. Due to this, the control device 8 controls the construction machine 1 in the second mode. That is, the construction machine 1 uses the power from at least one of the power supply device 71 and the battery 72 thereby to drive the electric motor 5. Driven by the electric motor 5, the construction machine 1 performs digging work using the work instrument 3, ground leveling work using the blade 23, or run by the lower run body 2. Further, in the case of sufficient output of the power supply device 71, the power output from the power supply device 71 is used thereby to charge the battery 72.

In the example shown in FIG. 7, time B corresponds to a time point when the supply of electric power from the commercial power source 100 to the construction machine 1 starts; at this point, the control device 8 starts controlling the construction machine 1 in the second mode. The SOC of the battery 72 is below the preset lower limit at the time point of determining the establishment of the second mode, thus starting charging of the battery 72. That is, the SOC of the battery 72 starts increasing. Further, in the example in FIG. 7, it is assumed that while the second mode is determined to be established, the output of the power supply device 71 is sufficient relative to the power necessary for driving the electric motor 5.

In the example shown in FIG. 7; in the second mode, an upper limit UL1 (such as 80%) is set for the SOC of the battery 72. Due to this, the battery 72 is free from being charged beyond the upper limit UL1. As described above; in the example shown in FIG. 7, the output of power supply device 71 is sufficient; thus, the SOC of the battery 72 is kept at the upper limit UL1 without using the power of the battery 72 until the work is completed after the establishment of the second mode. However, in response to the power necessary for driving the electric motor 5, the power of the battery 72 may be used during the work in the second mode.

When the one-day work at the construction site is completed (time C), the user turns on the charge start switch 9 in preparation for the next daily work. As a result, the control device 8 detects both the energizing signal and the charge ON signal, determining that the third mode is established. The control device 8 starts controlling the construction machine 1 in the third mode. That is, the output from the power supply device 71 charges the battery 72 only.

In the example shown in FIG. 7, an upper limit UL2 (for example, 100%) of the SOC of the battery 72 in the third mode is set higher than the upper limit UL1 in the second mode. Due to this, switching from the second mode to the third mode starts charging the battery 72, charging the battery up to the upper limit UL2. Performing the charging up to the upper limit thereafter to complete the charging action in the third mode (time D) stores the battery 72. The completing of the charging action is, for example, at the time point when the construction machine 1 is turned off. Further, in this example, the upper limit of the SOC of the battery 72 in the first mode is the same as the upper limit UL2 of the SOC of the battery 72 in the third mode.

In the example shown in FIG. 7; at the time of using the construction machine 1, the SOC of the battery 72 is smaller than the SOC at the time of storing the battery 72 (upper limit UL2), not higher than necessary. This can suppress the battery 72 from being deteriorated. Further, the method of storing the battery 72 may be different from that in the example shown in FIG. 7. For example, such a storage method may be employed as in which after the work is ended, charging and discharging control is performed so that the SOC becomes proper for charging, and just before the work starts, the SOC becomes the upper limit UL2. This can suppress the battery 72 from being deteriorated both at the time of using the construction machine 1 and at the time of storing the battery 72 without the use of the construction machine 1, making it possible to further extend the life of the battery 72.

When the construction machine 1 is left at the construction site, for example, it is determined, at the time of starting use of the construction machine 1, that the second mode is established. In this case, despite the second mode being established, the state of charge of the battery 72, as the case may be, exceeds the upper limit UL1 of the state of charge of the battery 72 in the second mode. When the state of charge of the battery 72 at the start of the second mode exceeds the upper limit UL1 of the state of charge of the battery 72 in the second mode, it is preferable, for example, that actively using the power of the battery 72 such as driving the electric motor 5 only with the power of the battery 72 thereby to reduce the state of charge of the battery 72 below the upper limit UL1.

4. Modified Example of Charge Control

Figure 8:
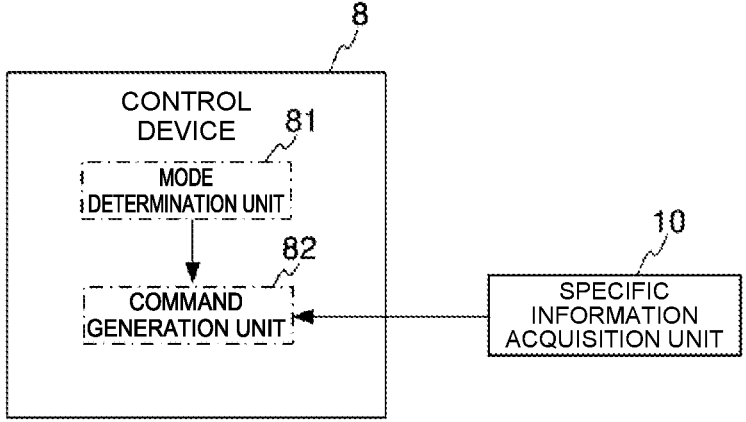
FIG. 8 is a block diagram for explaining about the construction machine of a modified example.

FIG. 8 is a block diagram for explaining about the construction machine 1 of a modified example. In the construction machine 1 of the modified example; in addition to the above information (for example, energizing signal, charge ON signal, SOC of battery 72, etc.) of the embodiment, specific information acquired by a specific information acquisition unit 10, which is provided outside the control device 8, is input to the control device 8.

Then, the control device 8, in the second mode and in the case of charging the battery 72 while driving the electric motor 5 with the power output from the power supply device 71 (first power), fluctuates a target increase rate of the state of charge of the battery 72 according to specific information input from the outside. According to the above configuration, the speed at which the battery 72 is charged can be changed according to, for example, the drive state of the electric motor 5 and the environment for placing the battery 72. As a result, the load on the battery 72 can be reduced during the action of the electric motor 5 thereby to make it possible to extend the life of the battery 72.

Further, it may be so configured that the fluctuation of the target increase rate of the state of charge is performed only when a battery safe mode, which is a mode of suppressing the load on the battery 72 at the time of charging, is selected by the user such as the operator. It may be so configured that the battery safe mode is selected, for example, by operating the operation unit such as the operation button, the operation lever, the operation dial, the touch screen, etc.

The control device 8, according to the set target increase rate of the state of charge of the battery 72 and according to the power consumed by the electric motor 5, controls the current supplied from the power supply device 71. With this; while properly supplying electric power to the electric motor 5 thereby to suppress the reduction in workability of the work using the construction machine 1, the charge speed of the battery 72 is properly controlled thereby to make it possible to suppress the load on the battery 72. Further, the electric power consumed by the electric motor 5 is acquired by various information (for example, operation information of the lever 41b of the operation seat 41a, actual RPM of the electric motor 5, etc.) input to the control device 8.

Figure 9:
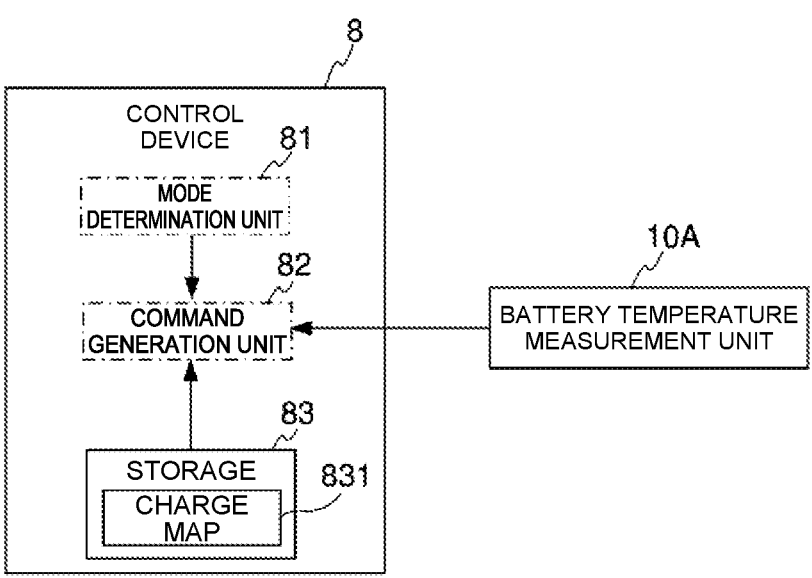
FIG. 9 is a block diagram showing a detailed example of the construction machine of the modified example.

The specific information may include a temperature of the battery 72. With this, the speed of charging the battery 72 can be properly controlled according to the temperature environment for placing the battery 72, reducing the load on the battery 72 thereby to make it possible to extend the life of the battery 72. FIG. 9 is a block diagram showing a detailed example of the construction machine 1 of the modified example. In the detailed example shown in FIG. 9, the above specific information acquisition unit 10 is a battery temperature measurement unit 10A. The battery temperature measurement unit 10A may be built in the battery 72. In this case, it may be so configured that the battery 72's temperature measured by the battery temperature measurement unit 10A is sent to the control device 8 by the battery ECU 721.

The lower the temperature of the battery 72, the lower the resistance of the battery 72. Due to this, performing the charging at the current value normally used at the time of drop of the temperature of the battery 72 increases the speed for reaching a target charge voltage, thus, as the case may be, excessively increasing heat amount generated by the battery 72. Charging in such a large heat-generating state puts a load on the battery 72, thus, as the case may be, shortening the life of the battery 72. Due to this, it is preferable to determine the target increase rate of the state of charge of the battery 72 according to the temperature of the battery 72.

The control device 8 (command generation unit 82), in the second mode and for charging the battery 72 while driving the electric motor 5 with the power output from the power supply device 71, sets the target increase rate of the state of charge of the battery 72 according to the battery 72's temperature input from the battery temperature measurement unit 10A. For example, a charge map 831 preliminarily stored in a storage 83 provided in the control device 8 is used for setting the target increase rate.

Figure 10:
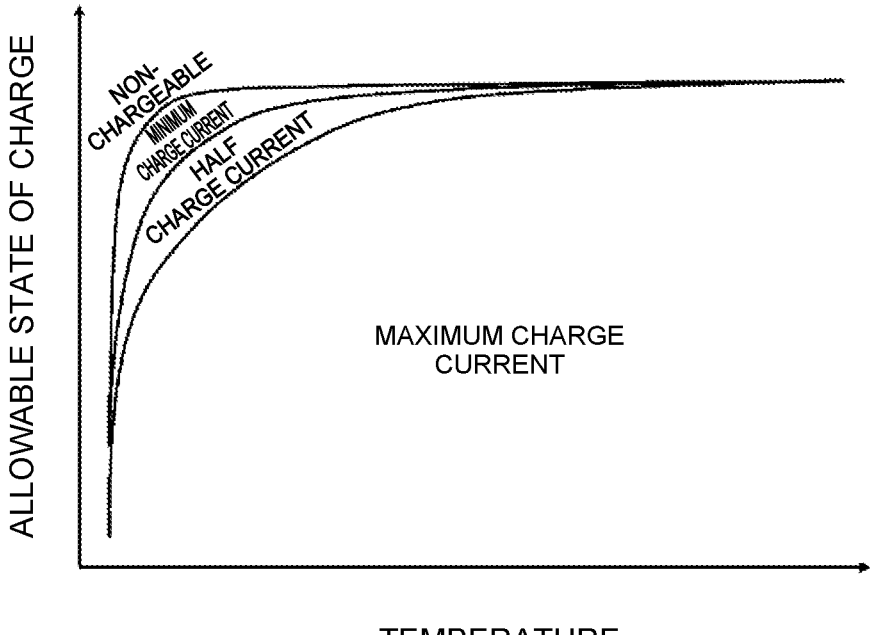
FIG. 10 is a schematic diagram showing an example of a charge map.

FIG. 10 is a schematic diagram showing an example of the charge map. In FIG. 10, the horizontal axis is temperature and the vertical axis is the allowable state of charge. The allowable state of charge is the state of charge that the battery 72 can receive, and is higher the lower the SOC of the battery 72. Further, FIG. 10 shows a case where a certain output is assumed.

In the map in FIG. 10, the area shown by the maximum charge current is an area showing that the charging may be performed at the maximum charge current. The area shown by the minimum charge current is an area showing that the charging may be performed at the minimum charge current. The area shown by the half charge current is an area showing that the charging may be performed at the average of the maximum and minimum charge currents. A non-chargeable area is an area of prohibiting the charging. The maximum charge current, the minimum charge current, and the half charge current are current values preliminarily acquired by an experiment or the like, and correspond to the target increase rate of the state of charge of the battery 72. Further, in the case of the non-chargeable area, the target increase rate of state of charge cannot be set.

The control device 8 (command generation unit 82) determines the target increase rate of state of charge by referring to the charge map 831, from the SOC input from the battery ECU 721 and the temperature input from the battery temperature measurement unit 10A. As can be seen from the charge map 831 shown in FIG. 10, the lower the battery 72's temperature and the higher the allowable state of charge, the smaller the target increase rate is set. The control device 8 controls the power supply device 71 according to the set target increase rate and according to the electric power consumed by the electric motor 5. To the electric motor 5 and the battery 72, the power supply device 71 supplies the current determined according to the control device 8.

Further, the specific information may include information on an attachment to be attached to the tip of the work instrument 3 of the construction machine 1. In the above embodiment, the attachment is configured as a bucket 33. However, the attachment attached to the tip of the work instrument 3 may be replaceable. For example, the replaceable attachments may include, other than the bucket, a breaker (for example, hydraulic breakers) used for breaking work. In the above configuration, information on the attachment may be included in the specific information.

When the specific information includes the attachment information, the specific information acquisition unit 10 for acquiring attachment information may be, for example, an input unit into which the user, such as the operator, inputs the attachment information. Further, the specific information acquisition unit 10 for acquiring the attachment information may be an attachment detection unit that detects that the specific attachment has been attached.

The control device 8, when detecting the use of the specific attachment, sets the increase rate of the state of charge of the battery 72 as a target increase rate preset corresponding to the specific attachment. Then, the control device 8 controls the power supply device 71 according to the above target increase rate and according to the information on the electric motor 5's consumed power input to the control device 8. To the electric motor 5 and the battery 72, the power supply device 71 supplies the current determined according to the control device 8.

The specific attachments include, for example, the breaker. The work using the breaker often has little load fluctuation. Due to this, when the breaker is used as an attachment, setting a smaller target increase rate of the state of charge of the battery 72 allows the charging to be performed while stably keeping the load on the battery 72 low, making it possible to extend the life of the battery 72.

Further, it is possible to estimate, by the actual revolution speed of the electric motor 5, for example, whether or not the work performed by the construction machine 1 is work with little load fluctuation. Due to this, the specific information may include the actual revolution speed of the electric motor 5. With this; in the case of performing, for example, the breaker-using work or the leveling work which cause a little load fluctuation, the load on the battery 72 is suppressed thereby to make it possible to properly charge electricity. It may be so configured that the actual revolution speed of the electric motor 5 is input to the control device 8 from an inverter ECU (not shown), for example, that receives information from a position sensor provided in the electric motor 5.

5. Notes, Etc

Various technical features disclosed in the present specification can be changed in various ways without departing from the spirit of the technical creation thereof. Further, the plural embodiments and modified examples shown in the present specification may be combined to the extent possible.

In the above, the control device 8 is so configured as to control the own machine 1 any of the first mode (battery drive mode), the second mode (drive-chargeable mode), and the third mode (charge-only mode). However, the control device may be so configured as to control the own machine 1 in any of a plurality of modes including the first mode and the second mode. For example, the control device may be so configured as to control the own machine 1 in any of the first mode and the second mode. That is, the third mode, in which the power of the power supply device 71 is usable only for charging the battery 72, need not necessarily be provided.

Further, the control device may be so configured as to control the own machine 1 in any of a plurality of modes including the second mode and the third mode. For example, the control device may be so configured as to control the own machine 1 in any of the second mode and the third mode. That is, the first mode, in which the power of only the battery 72 is usable for driving the electric motor 5, need not necessarily be provided. In the above configuration, the electric motor 5 is driven, in principle, by the power from the power supply device 71, for example. Then, when the work load is high and the power from the power supply device 71 is not sufficient to drive the electric motor 5, the power from the battery 72 can be used so as to compensate for the lacking power.

DESCRIPTION OF REFERENCE NUMERALS

1: construction machine
5: electric motor
8: control device
71: power supply device
72: battery
100: commercial power source (external power source)
The invention claimed is:
1. A construction machine comprising:
a power supply device that is connected to an external power source and outputs a first power;
a battery that is so provided as to be capable of being charged by the first power;
an electric motor that is driven by at least one of the first power or a second power, wherein the second power is output by the battery, and
a control device that exercises control over a plurality of modes of the construction machine including

14 a battery drive mode in which the electric motor is driven solely by the second power, and
a drive chargeable mode in which the first power, while being used for driving the electric motor, is capable of charging the battery, and wherein
the control device sets a first upper limit that controls a state of charge of the battery in the drive chargeable mode, wherein the first upper limit is set to be lower than a second upper limit that controls the state of charge of the battery when in the battery drive mode.
2. A construction machine comprising:
a power supply device that is connected to an external power source and outputs a first power;
a battery that is so provided as to be capable of charging the first power;
an electric motor that is driven by at least one of the first power or a second power, wherein the second power is output by the battery, and
a control device that exercises control over a plurality of modes of the construction machine including
a drive chargeable mode in which the first power, while being used for driving the electric motor, is capable of charging the battery, and
a charge-only mode in which the first power is used to charge the battery without driving the electric motor, and wherein
the control device sets a first upper limit that controls a state of charge of the battery in the drive chargeable mode, wherein the first upper limit is set to be lower than a second upper limit that controls the state of charge of the battery when in the charge-only mode.
3. The construction machine according to claim 2, wherein
the plurality of modes further includes a battery drive mode in which the electric motor is driven solely by the second power.
4. The construction machine according to claim 1, wherein
the control device, when charging the battery while the electric motor is being driven by the first power in the drive chargeable mode, changes a charging rate based on the state of charge of the battery and specific information external to the control unit.
5. The construction machine according to claim 4, wherein the specific information includes a temperature of the battery.
6. The construction machine according to claim 4, wherein
the control device further controls a current supplied from the power supply device based on power consumed by the electric motor and the changes to the charging rate.
7. The construction machine according to claim 1, wherein
in the drive chargeable mode, the electric motor is driven by at least one of the first power or the second power.

* * * * *